UNITED STATES PATENT OFFICE.

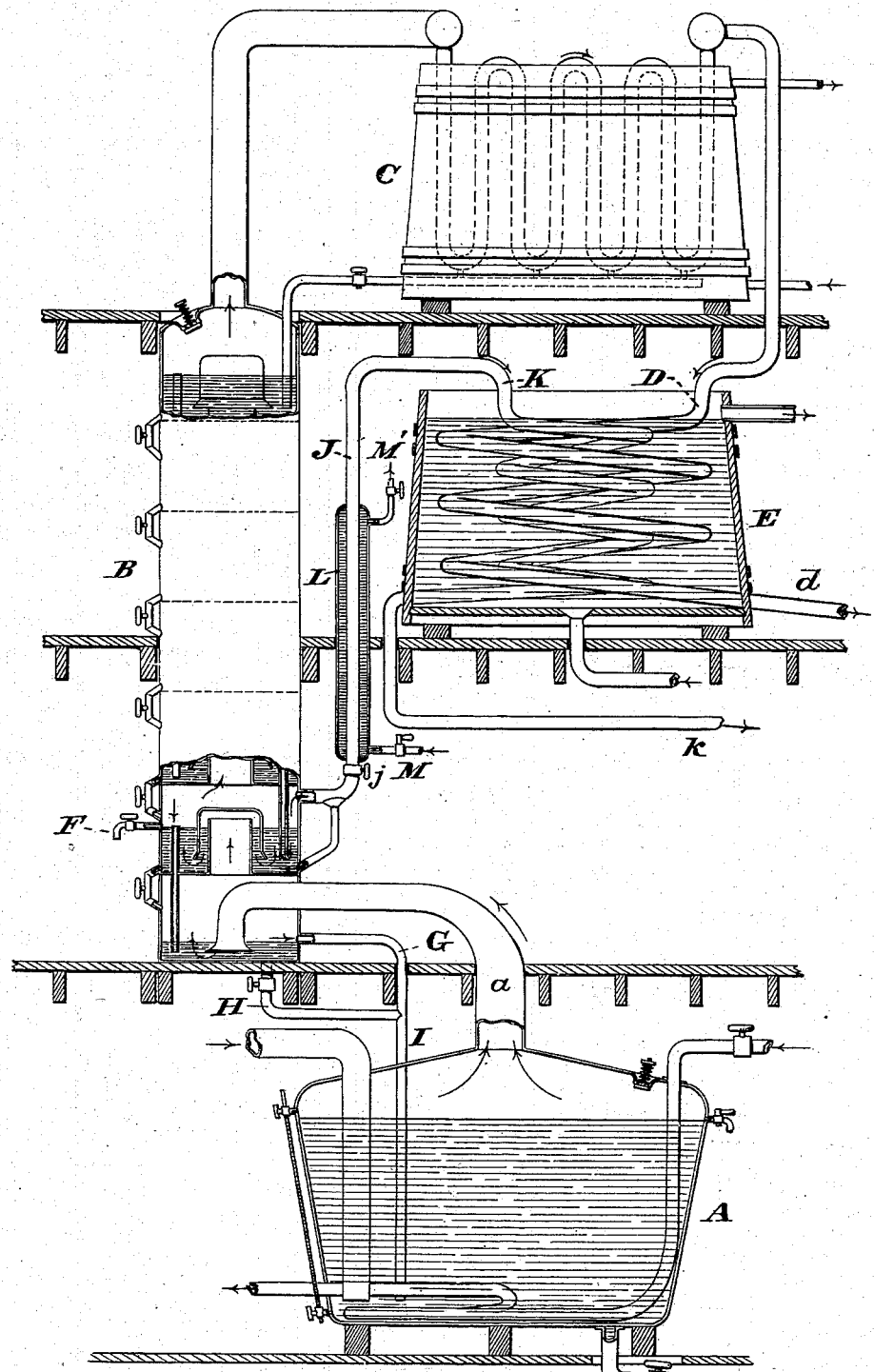

HENRY C. SELDEN, OF CINCINNATI, OHIO.

DISTILLING APPARATUS.

SPECIFICATION forming part of Letters Patent No. 276,483, dated April 24, 1883.

Application filed January 2, 1883. (No model.)

*To all whom it may concern:*

Be it known that I, HENRY C. SELDEN, of Cincinnati, Hamilton county, Ohio, have invented new and useful Improvements in Distilling Apparatus, of which the following is a specification.

My invention relates to certain adjuncts to the customary distilling apparatus, which have for their object the more prompt and effectual elimination at the earliest practical stage of the process of the fusel-oils and other impurities that accompany alcoholic vapor in the act of distillation, so as to economize in time, fuel, and material, and to produce a better and purer spirit at less cost.

My invention is especially designed to be used in connection with apparatus which have a many-chambered purifying column or stand.

My improvement consists in the construction hereinafter described, and pointed out in the claims.

The accompanying drawing is a diagrammatic representation of a distilling apparatus embodying my improvements.

A may represent any customary or suitable still or evaporating-kettle, and $a$ the vapor-pipe thereof, discharging into bottom chamber of column B. For convenience of illustration, the column B is represented of greater relative diameter and of less height and number of chambers or compartments than are ordinarily employed.

C represents a customary intermediate condenser for the elimination and return to the column of such watery and other heavy impurities as remain in company with the alcohol-vapor, notwithstanding the separating agencies of my column B, and of the special separating mechanism, to be shortly described.

D is the worm proper, $d$ the worm-tail, and E the surrounding tub of cold water.

One of the lower chambers or compartments of the column has a tri-cock, F, and its lowest chamber has return and discharge pipes G and H, that empty into the still either through a single conduit, I, as shown, or separately.

All of the above-mentioned parts, with their represented accessories, may be of accustomed forms, and require no minute description.

In order to eliminate the fusel-oil and other impurities before they have had time to taint the charge, I provide the following adjuncts:

J is a pipe, which, conducting upward from one of the lowermost chambers of the separating-column, terminates in a worm, K, that occupies the same cold-water tub E that contains the worm proper. The pipe J is for a portion of its length surrounded by a "jacket," L, whose respective extremities are provided with a cold-water-supply pipe, M, and a pipe, M', for discharge of the same water after having been heated by contact with the walls of pipe J.

The above-described preferred form of my invention may be varied in non-essential particulars. For example, the pipe J may ascend from the vapor-pipe $a$ instead of from the column; or its lower end may consist of two branches, of which one may communicate with the column and the other with the vapor-pipe.

The above means enables the attendant to take the ethers and like volatile impurities off at the beginning of the run, and subsequently, as they accumulate, to remove the tainted low-wines and other heavy impurities and to leave liquor in the column at every charge, which keeps full proof at the worm-tail, and to produce, from a given charge of low-wines improved returns in merchantable spirit and in greater quantity.

Whenever the opened tri-cock F discloses the presence in the column of mephitic vapor the cock $j$ in pipe J is opened, and the oil is allowed to escape by the more direct way of exit afforded by said pipe, and, being condensed by contact with the cool walls of the worm K, escapes at the supplementary worm-tail $k$. This action is allowed to continue until the appearance of pure spirit in the case of ethers, or of water in the case of heavy oils at the tail $k$, indicates the elimination, for the time being, of the impurities. The cock $j$ is then closed, and the work proceeds as before. This operation is accomplished in a space of time whose extreme brevity is in marked contrast with that usually consumed in the purification of the column by steam, or hot water, or in cooling down to let the fusel-oil run back into the still. Still more important than this saving of time and labor, although considerable, is the avoidance of contamination of the walls of the containing-vessel and thence of the spirit itself.

The avoidance of contamination of the lining-walls enables the passage of a charge of any given grade to be followed immediately by a run of one grade higher without previously washing out the column.

I am aware that it has been proposed to separate the impurities of alcoholic distillation by means of a separate pipe and condenser, and that such pipe has had a refrigerating device included within it, as in Patent No. 50,688, and that such pipe has been passed through the same cold-water vessel that contains the main condensing-pipe, as in Patent No. 199,006. I therefore disclaim such devices separately considered.

I claim as new and of my invention—

1. In a distilling apparatus, the combination of the auxiliary pipe J, surrounded by cold-water jacket L, and terminating in a supplementary worm, K, a kettle, A, chambered column B, discharge and return pipes G H, and cold-water tub E, containing worm proper, D, the supplementary worm occupying the same tub with the worm proper, as set forth.

2. The combination, with the kettle A, chambered column B, discharge and return pipes G H, cold-water tub E, and worm proper, D, in a distilling apparatus, of the auxiliary pipe J, surrounded by cold-water pipe L, and terminating in a supplementary worm within the tub of the worm proper, as set forth.

In testimony of which invention I hereunto set my hand.

HENRY C. SELDEN.

Attest:
 GEO. H. KNIGHT,
 CARL SPENGEL.